Patented Sept. 28, 1937

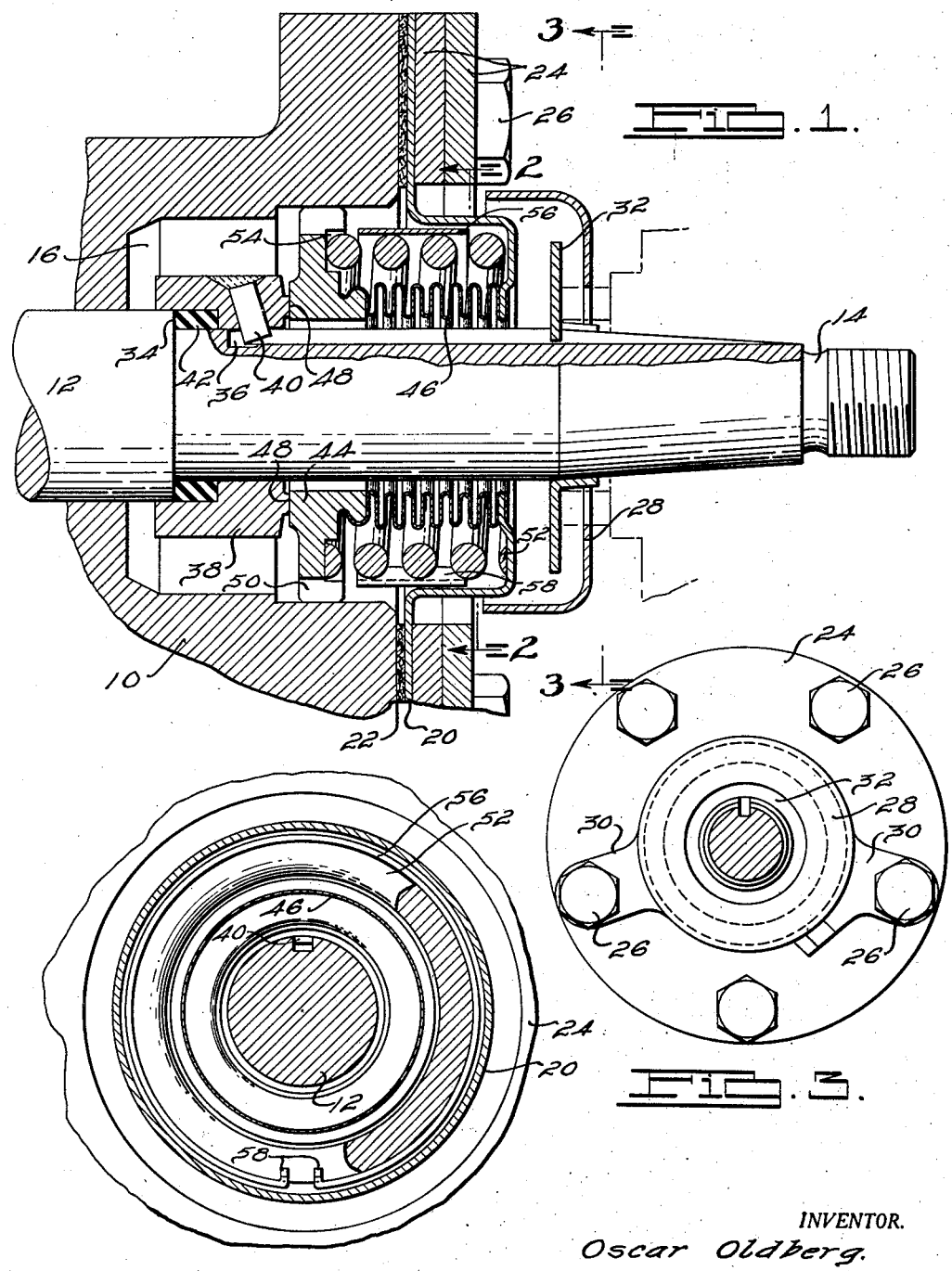

2,094,160

UNITED STATES PATENT OFFICE 2,094,160

SEAL CONSTRUCTION

Oscar Oldberg, Detroit, Mich., assignor to Borg-Warner Corporation, a corporation of Illinois Application May 8, 1935, Serial No. 20,448

4 Claims. (Cl. 286—11)

This invention relates to seal construction for a rotatable shaft extending through a wall of housings. The invention has particular application to relatively high speed shafts projecting from a housing in which the pressure of the contents thereof such as a lubricant is under a relatively high pressure. Compressors such as are used in connection with refrigerating systems are one illustration of the mechanism with which a device constructed in accordance with this invention is adapted to be used.

This invention contemplates the provision of a running balanced pressure seal comprising in general a pair of relatively rotatable sealing members, a coil spring for resiliently holding said members in operative relationship, a bellows for connecting one of said members to a wall of a housing through which a shaft extends, and means associated with the coil spring for dampening the vibrations thereof attending the rotation of the shaft.

A principal object of the invention is to provide a seal construction which is more efficient in operation, which is more durable, and which is quiet in operation.

Other objects and advantages of the invention will be apparent from a reference to the following specification, taken in conjunction with the acompanying drawing, of which there is one sheet and in which:

Fig. 1 is a view partly in section, illustrating the application of a device embodying the invention to a shaft such as the shaft of a refrigerant compressor;

Fig. 2 is a sectional view of the device illustrated in Fig. 1 taken in a plane along the line 2—2 of Fig. 1, looking in the direction of the arrows; and Fig. 3 is an end elevational view of the seal side of the compressor taken along the lines 3—3 of Fig. 1, looking in the direction of the arrows.

A refrigerant compressor or pump, a portion of which is indicated generally at 10, is provided with a crank or operating shaft 12 by means of which the compressor or pump is adapted to be operated such as by a pulley connected to the screw-threaded end 14 of the shaft 12. The shaft 12 is journaled in the housing of the pump or compressor 10, which is provided with a seal chamber 16 which is adapted to be supplied with lubricant under the discharge pressure of the pump. The seal chamber 16 is closed by a plate 20 which rests against an annular gasket 22 disposed against the body 10 about the seal chamber 16 and backed by a plurality of plates 24, all of which are secured in position by a plurality of stud bolts 26 which pass through openings in the plates 20 and 24 and the gasket 22 and are threaded into suitable openings in the body of the pump 10.

A cap 28 is provided for shielding the exposed side of the plate 20 and is provided with a pair of flanges 30 by means of which it is secured by means of the stud bolts 26 to the body of the pump 10. A collar 32 is pressed on to the shaft 12 to act as a dust guard for the seal end thereof.

The shaft 12 is suitably journaled in bearings provided in the body of the housing 10 and is also provided with thrust bearings for preventing axial movement of the shaft in excess of a limited movement of several thousandths of an inch in either direction. Within the seal chamber 16 the shaft 12 is provided with a shoulder 34, and the reduced portion of the shaft is provided with a spline 36. A sealing member 38 is disposed on the shaft 12 and connected to rotate therewith by means of a pin 40 carried by the sealing member 38 and projecting into the spline 36 so that the sealing member 38 may move axially of the shaft 12. The sealing member 38 is provided with a sleeve-like portion which is adapted to telescope the portion of the shaft 12 beyond the shoulder 34, and between the shoulder 34 and the sealing member 38 and within the sleeve-like portion thereof there is disposed a resilient annular collar 42 which is adapted to seal between the shaft 12 and the sealing member 38 and to limit the movement of the sealing member 38 in one direction.

A non-rotatable sealing member 44 is disposed within the seal chamber 16 and is connected to the wall or plate 20 by means of a bellows 46 which is soldered at its ends thereof to the sealing member 44 and the plate 20 to form a fluid-tight joint. The sealing members 38 and 44 are each provided with a seal face, which faces are in contact and form a running seal. The seal faces 48 are highly polished to form as true and flat a surface as is possible so as to prevent the escape of fluid therebetween when the seal is in use. The sealing member 44 is provided with a plurality of peripheral notches 50 which provide a communication between the portions of the seal chamber 16 on the opposite sides of the sealing member 44.

Between the sealing member 44 and the plate 20 and telescopically disposed with respect to the bellows 46, there is disposed a coil compression spring 52 having ground ends, one of which is disposed within an annular groove 54 provided in the sealing member 44 and the other of which abuts the plate 20. The coil spring 52 forms a resilient backing for the sealing member 44 and when in operative position biases both of the sealing members to the left, looking at Fig. 1, against the resilient collar 42.

It has been found that in operation the spring 52 will vibrate as a result of the operation of the shaft, thereby causing a noise which is objectionable if the seal is used in connection with a refrigerant compressor of a domestic refrigerating apparatus. For the purpose of dampening the vibrations of the coils of the spring 52, there is provided a flat spring 56 which is telescopically disposed with respect to the coils of the spring 52 and is in frictional engagement therewith. The flat spring 56 is provided at its ends thereof with turned-in portions 58 which engage some of the coils of the spring 52, and serve to prevent the spring 56 from rotating with respect to the spring 52. The flanges 58 also provide a positive connection between the central coil of spring 52 and spring 56 for more effectively damping vibrations of such coil. As the coils of the spring 52 are in frictional engagement with the flat spring 56, the vibrations of the coils of the spring 52 will be substantially dampened, thereby eliminating the noise caused by such vibrations.

The seal chamber 16 is in communication with the main body of lubricant within the pump or compressor casing, which is under the discharge pressure of the pump. The notches 50 in the sealing member 44 provide communication between the portions of the sealing chamber 16 on the opposite sides of the sealing member 44 so that the lubricant under pressure will be communicated to all portions of the sealing chamber. The effective cross sectional area of the bellows is substantially equal to that of the seal to provide what is commonly referred to as a balance pressure seal; that is, the pressure between the seal faces is substantially independent of the pressure within the seal chamber, due to the discharge pressure of the pump.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

I claim:

1. In a seal, a pair of relatively rotatable sealing members, opposing spring means operable for resiliently holding said member in operative relationship, and means associated with and disposed around said spring means and connected to a center portion thereof and operable for dampening the vibration of said opposing spring means.

2. Seal construction for a shaft extending through a wall of a housing comprising a sealing member carried by said shaft so as to be rotatable therewith, a non-rotatable sealing member disposed about said shaft and having a slight amount of axial movement with respect to said shaft, a bellows connecting said non-rotatable sealing member to said wall of said housing, said sealing members being provided with seal faces, coil spring means acting on one of said sealing members for resiliently holding said seal faces in contact and a flat spring disposed externally of said coil spring whereby said flat spring is easily removable from said seal construction and operable for dampening vibrations of said coil spring, said flat spring being provided with fingers engageable with the coils of said coil spring means.

3. Seal construction for a shaft extending through a wall of a housing comprising a sealing member carried by said shaft so as to be rotatable therewith and to have a limited amount of axial movement relative thereto, a non-rotatable sealing member disposed about said shaft, said sealing members being provided with seal faces in contact to provide a running seal about the shaft, a bellows connecting said non-rotatable sealing member to said wall, a coil spring confined between said non-rotatable sealing member and said wall and telescopically disposed with respect to said bellows, and a flat spring telescopically and externally disposed with respect to said coil spring and connected to the center coil thereof and in frictional engagement with all the coils thereof for dampening the vibrations thereof, the disposition of said flat spring being such as to allow easy removability thereof from said seal construction.

4. Seal construction for a shaft extending through a wall of a housing comprising a pair of relatively rotatable sealing members, a coil spring acting on one of said sealing members for resiliently holding the same in operative relationship with the other of said sealing members, and a flat spring outwardly and telescopically disposed with respect to said coil spring and in frictional engagement with the coils thereof for dampening vibrations set up in said spring as a result of the rotation of said shaft, said flat spring being positioned so that it is easily removable from the seal construction and removably connected to the center coil of said coil spring.

OSCAR OLDBERG.